March 12, 1957 G. JONSSON 2,784,450
METHOD OF CLEANING SHRIMP
Filed March 23, 1953 11 Sheets-Sheet 1

INVENTOR.
Gregor Jonsson
BY Moore, Olson & Trexler
attys

March 12, 1957 — G. JONSSON — 2,784,450
METHOD OF CLEANING SHRIMP
Filed March 23, 1953 — 11 Sheets-Sheet 2

INVENTOR.
Gregor Jonsson
BY
Moore, Olson & Trexler
attys.

March 12, 1957  G. JONSSON  2,784,450
METHOD OF CLEANING SHRIMP
Filed March 23, 1953  11 Sheets-Sheet 6

INVENTOR.
Gregor Jonsson
BY
Moore, Olson & Trexler
attys

March 12, 1957

G. JONSSON 2,784,450

METHOD OF CLEANING SHRIMP

Filed March 23, 1953

INVENTOR.
Gregor Jonsson
BY
Moore, Olson & Trexler
attys.

United States Patent Office 2,784,450
Patented Mar. 12, 1957

2,784,450

METHOD OF CLEANING SHRIMP

Gregor Jonsson, Lake Forest, Ill.

Application March 23, 1953, Serial No. 343,849

7 Claims. (Cl. 17—45)

This invention is concerned with the processing of food, particularly with a machine for cleaning shrimps.

A shrimp is covered with a shell and contains an inedible sand vein near its back. This vein must be removed before a shrimp is canned, frozen, or cooked. It further is generally desirable to remove the shrimp meat from thet shell, although occasionally it may be desirable to leave the meat in the shell.

Hand removal of veins and hand shelling is tedious and inefficient and consequently is most undesirable when large numbers of shrimps must be handled. Prior methods and machines developed for removing the veins from shrimps and separating the meat and shells have not been successful in producing a large yield of clean meat, or else have required a great amount of hand work. More specifically, either the vein has not been completely removed, or too much meat has been removed adjacent the vein, and much of the meat has been left clinging to the shell.

Accordingly, it is an object of this invention to provide a shrimp processing method and machine for quickly producing a higher yield of clean meat than heretofore thought possible.

A more specific object of this invention is to provide a method and machine for slitting shrimp backs and moving the meat and shell relatively longitudinally to effect separation of the meat and shell.

An object of this invention is to provide an improved shrimp processing or cleaning machine which is entirely enclosed, thereby being sanitary and neat in appearance.

Another object of this invention is to provide a shrimp cleaning machine operable on shrimps of any size within a wide range with no necessity of grading the shrimps as to size.

A further object of this invention is to provide a shrimp cleaning machine in which the shrimps are more readily loaded into the machine at a single station and are thereafter handled entirely automatically.

Another object of this invention is to provide, in a shrimp cleaning machine, a new or improved shrimp carrier.

A more specific object of this invention is to provide a shrimp cleaning method and machine wherein the shrimps are grasped by the tail and fed tail first for processing.

Another object of this invention is to provide a shrimp cleaning machine having improved means for positioning shrimps on a carrier.

Another object of this invention is to provide a shrimp cleaning machine having a fly wheel which insures smooth operation and serves as a carrier for carrying shrimps as they are processed.

A further object of this invention is to provide a shrimp cleaning machine having an improved knife which both slits the shells of shrimps and digs out the veins.

Another object of this invention is to provide a shrimp cleaning machine having improved means for separating the shell and the meat.

Yet another object of this invention is to provide a shrimp cleaning machine which removes the shells from the shrimps or leaves the shells on the shrimps as desired by the operator.

Other and further objects and advantages of the present invention will be apparent from the following description when taken in connection with the accompanying drawings wherein.

Figure 1:
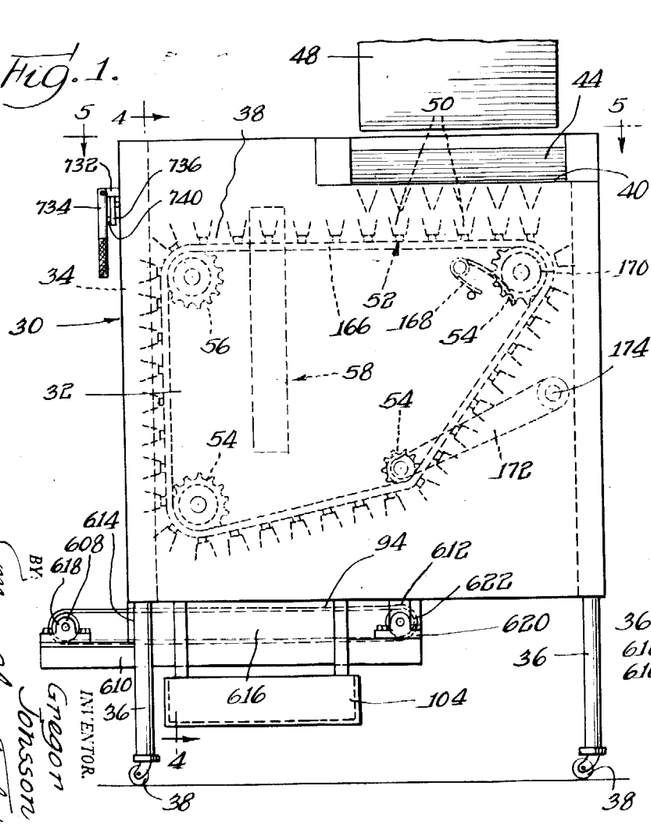
Fig. 1 is a front view of a machine embodying the principles of my invention.
Figure 2:
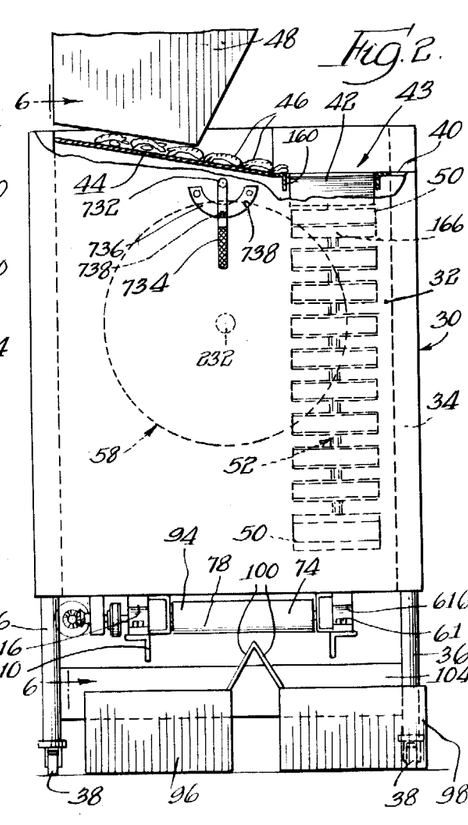
Fig. 2 is a side view of the machine.
Figures 3, 3A, 3B, 3C, 3D, 3E, 3F:
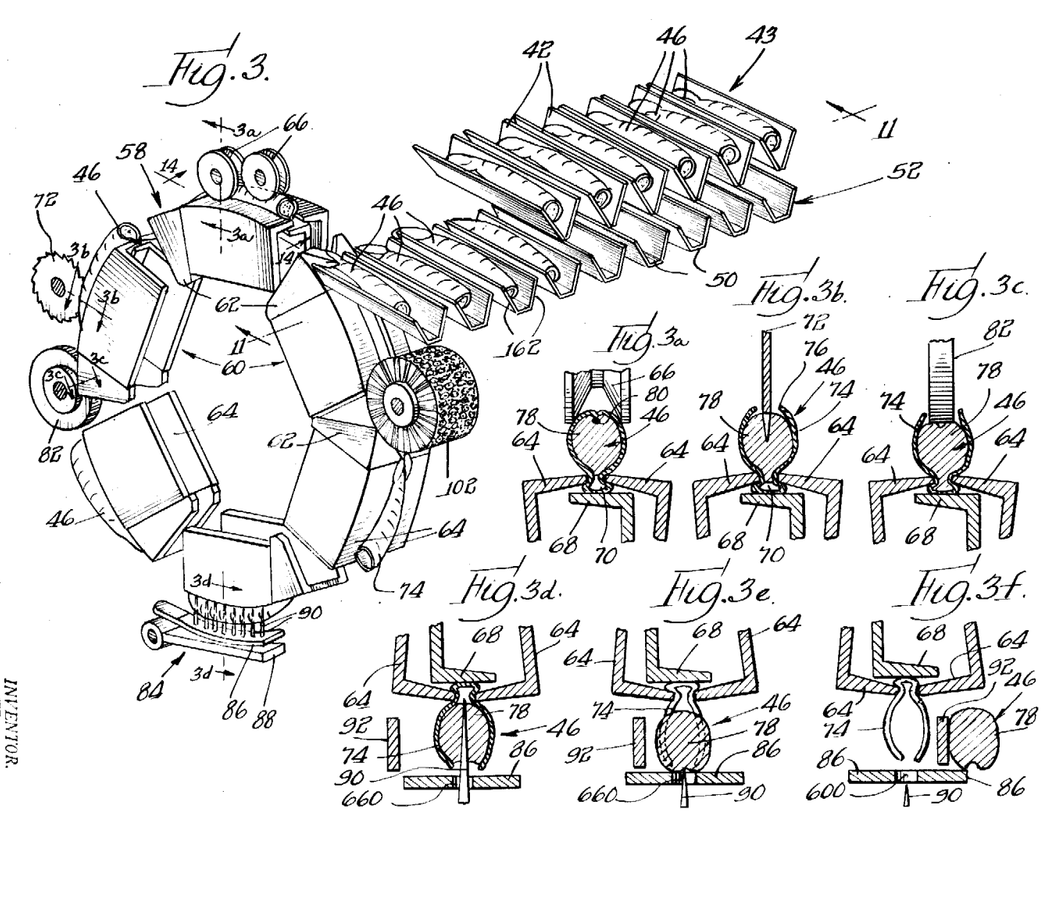
Fig. 3 is a somewhat schematic perspective view showing certain of the operating parts of the machine.
Fig. 3a is a sectional view on an enlarged scale taken along the line 3a—3a of Fig. 3.
Fig. 3b is a sectional view on an enlarged scale taken along the line 3b—3b of Fig. 3.
Fig. 3c is a sectional view on an enlarged scale taken along the line 3c—3c of Fig. 3.
Figs. 3d, 3e, and 3f are sectional views on an enlarged scale taken in sequence along the line 3d—3d of Fig. 3.

Reference first should be had to Figs. 1–3 and also to Figs. 3a–3f for a general understanding of my invention so that the details and specific constructional features thereafter set forth will more readily be understood. A shrimp-cleaning machine 30 embodying the principles of my invention includes a rectangular casing 32 having a frame 34 made up of angle members and channels as will hereinafter be more fully set forth and may be seen at a brief glance in any of Figs. 4–10. Legs 36 extend downwardly from the four corners of the machine and are provided at their lower ends with casters 38.

The casing 32 is provided with a shelf 40 at the right front corner thereof which is recessed from the top of the casing and which is provided with a central opening accommodating a plurality of V-shaped receptacles or trays 42 for receiving shrimp and hereinafter termed a receiver 43. An inclined plate 44 recessed in the top of the casing 32 leads down to the shelf 40 and receptacles 42 for gravitationally feeding shrimps 46 toward the receptacles from a position beneath the open bottom of a hopper 48 positioned above the casing. The shrimps 46 sliding down the plate 44 are loaded individually by hand into the receptacles 42 with the tails thereof positioned away from the operator and up against tongues or stop plates hereinafter to be set forth in detail in order to position the shrimps accurately regardless of their sizes.

At predetermined intervals the sides of all of the trays 42 spread apart to drop the shrimps in the trays into trays 50 of a loading conveyor 52. The loading conveyor is intermittently operable and is stationary while the shrimps are dropped into it. The conveyor trays 50 are shorter than the receiver trays 42 so that the tails of the shrimps project outwardly therefrom. The conveyor 52 passes over a plurality of idler sprockets 54 and a drive sprocket 56 and includes a horizontal reach which passes above a rotary or disc conveyor or carrier 58. This carrier comprises a plurality of sets of clamps 60 equal in number to the receptacles 42. The carrier and receptacles are operated in timed relation so that shrimps are dropped from the receiver receptacles 42 in timed relation with the movement of the conveyor 52 to fill each of the trays thereof for loading shrimps on to the carrier 58. Each set of clamps 60 comprises a tail clamp 62 and a body clamp 64. The direction of rotation of the carrier 58 as indicated by the arrows is such that the tail clamps 62 lead the body clamps 64. As the clamp sets ascend beneath the conveyor trays 50, the clamp sets are open. Each tail clamp closes opposite a conveyor tray 46, the loading conveyor being stationary at this time, to clamp the tail of a shrimp thereby to pull the shrimp from the conveyor tray. The bodies of the shrimps 46 are straightened by means hereinafter to be described so that they are aligned with the space between the body clamps 64. The shrimps' bodies are pushed down part way into this space by grooved rollers 66 against a back-up plate 68 (Fig. 3a) and the body clamps 64 are closed. The underside or belly of a shrimp is provided with a number of appendages and is rather soft. The underside or belly is thereby pinched or clamped between the clamps 64 as at 70.

Rotation of the carrier 58 carries each shrimp 46 past a rotating knife 72 of unique configuration which simultaneously slits the shell 74 down the back as indicated at 76 in Fig. 3b and at the same time cuts slightly into the meat 78 to pull out the sand vein 80. The pinching of the belly at 70 between the body clamps 64 causes the shell to spread apart along the slit 76 as soon as it is cut by the knife 72.

Continued rotation of the carrier 58 moves each shrimp 46 past a roller or disc 82 which presses the meat 78 in toward the back-up plate 68 as shown in Fig. 3c, thereby pulling the meat away from shell 74. After the meat has thus been separated in part from the shell, continued rotation of the carrier 58 brings each shrimp into position above a meat separating mechanism 84. The meat separating mechanism comprises a perforated stripper plate 86 beneath which is positioned a plate 88 carrying a plurality of spikes 90. The spikes periodically move up in timed relation to the movement of the carrier and at a very rapid rate to penetrate the meat 78 without tearing thereof as shown in Fig. 3d. The carrier 58 then moves with the meat impaled on the spikes so that the body clamps pull the shell 74 longitudinally away from the meat 78.

The spikes 90 then are retracted and the stripper plate 86 pulls the meat 78 from the spikes 90 as shown in Fig. 3e. A pusher 92 then moves across the top of the stripper plate to push the meat 78 of the shrimp from the side of the stripper plate 86 as indicated in Fig. 3f. The shells 74 are carried beyond the end of the meat separating mechanism 84 to be dropped by opening of the clamps as shown in Fig. 3.

The shrimp meat 78 pushed from the side of the stripper plate 86 and the shells 78 dropped from the body clamps 64 fall on to a conveyor 94 (Figs. 1 and 2) beneath the casing 32. From the end of the conveyor, the meat and shells drop into a pair of receivers 96 and 98 for further disposition. Angularly disposed plates 100 above and between the receivers insure that the meat and shells will fall into their respective receivers. It will be understood that the receivers 96 and 98 could be replaced with conveyors for feeding the shrimp meat and shells to remote locations if desired.

A rotating brush 102 (Fig. 3) is positioned adjacent the periphery of the carrier 58 for cleaning the clamps 60. Debris falling from the clamps, and also water from within the machine are caught in a tray 104 (Figs. 1 and 2) beneath the casing 32.

*The receiver*

The receiver 43 comprises, as aforenoted, a plurality of receptacles or trays 42 (Figs. 1–3, 5, and 11–13). Each tray comprises a pair of side plates 106 (Figs. 11–13) mounted at their upper edges on pivotal mounts 108 at one end, and pivotal mounts 110 at the opposite end. The pivotal mounts 108 are mounted on a fixed wall 112 supported by means shortly to be disclosed. The pivotal mounts 110 are supported by stub shafts 114 journaled in a horizontal support 116 which is supported by any desirable means including a cross angle member 118 from the frame 34 of the machine.

Fixed bars 120 extend from the support 116, and are provided with reduced end portions 122 (Fig. 13) extending through the support 116. Nuts 124 are threaded on the ends of the reduced portions for tightly holding the bars 120 in the support 116. The opposite ends of the bars likewise are reduced and extend through the fixed wall 112 for supporting the same, nuts 126 being threaded on these reduced ends to hold the parts in place.

Figure 11:
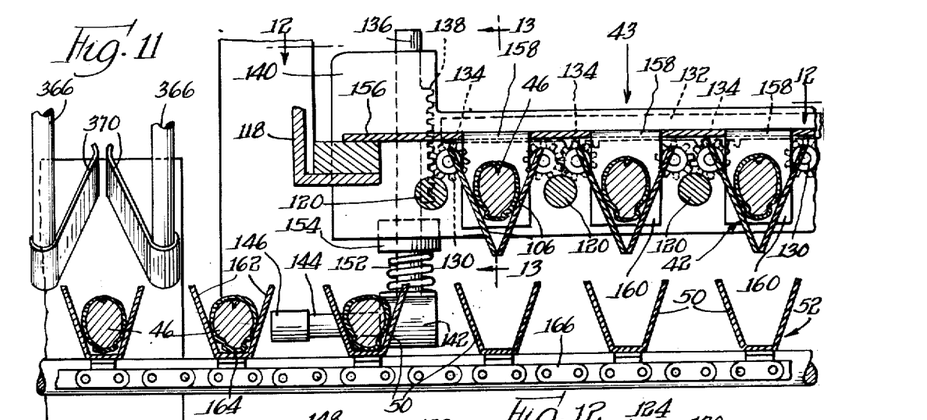
Fig. 11 is a vertical sectional view on an enlarged scale through the loading mechanism taken substantially along the line 11—11 of Fig. 3.
Figures 12, 13:
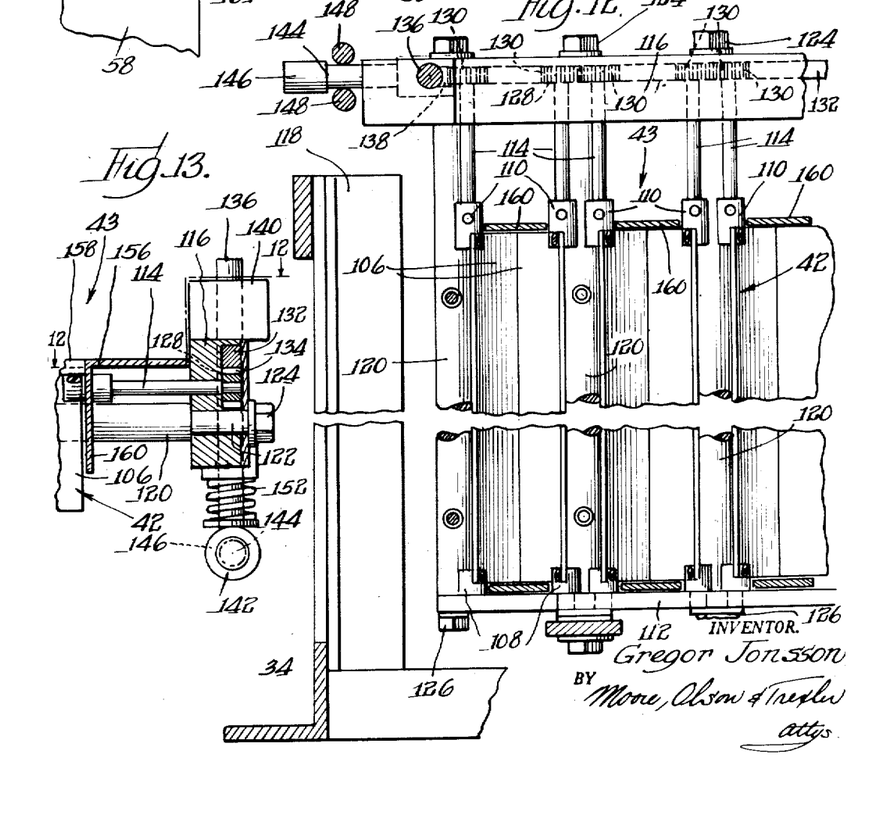
Fig. 12 is a top detail view taken along the line 12—12 of Fig. 11 and Fig. 13.
Fig. 13 is a vertical sectional view taken along the line 13—13 of Fig. 11.
Figures 14, 15:
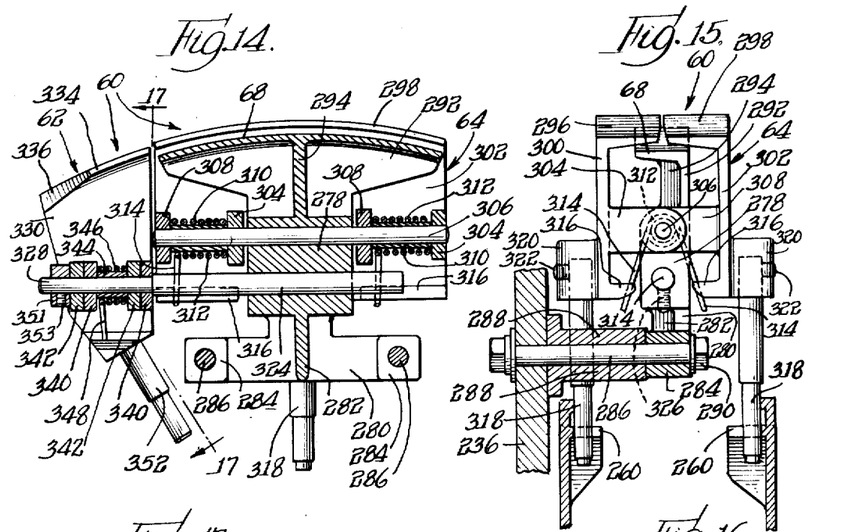
Fig. 14 is a sectional view through one of the clamps taken substantially along the line 14—14 of Fig. 3.
Fig. 15 is an end view of the clamp shown in Fig. 14.
Figure 16:
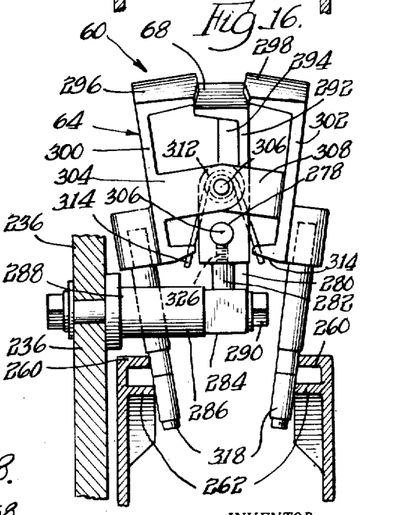
Fig. 16 is a view similar to Fig. 15 with the parts in a different position of operation.
Figure 17:
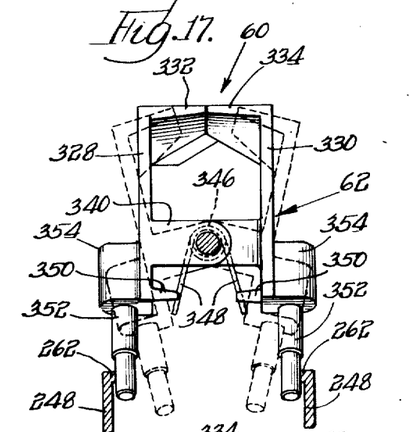
Fig. 17 is a view of the tail clamp taken along the line 17—17 of Fig. 14.

The support 116 is recessed as at 128 to accommodate gears 130 fixed on the ends of the shaft 114. The gears of adjacent shafts, these shafts being associated with different trays 106, are meshed with one another. A bar 132 is reciprocably mounted in the recess and is provided with depending rack teeth 134 at spaced intervals. These teeth engage one of every meshing pair of gears 130, the right hand pair as seen in Figs. 11 and 12, as well as the single gear at the left side of these two figures. The rack teeth 134 occupy sufficiently short spaces along the bar 132 so that they do not engage the left-hand gear of each pair. Therefore, when the bar is shifted to the right it rotates each right-hand gear 130 in a clockwise direction while the left-hand gear of each pair, being meshed with the right-hand gear, is rotated in a counterclockwise direction. This moves the side plates 106 of each tray or receptacle 42 away from one another to allow shrimps 46 therein to drop into the trays 50 of the loading conveyor 52. It will be understood that an idler gear (not shown) is provided for engaging rack teeth 134 on the bar 132 to pivot the side plate 106 of the right-hand tray 42 in the proper direction.

Longitudinal movement of the bar 132 is effected by a vertically reciprocable bar 136 (Figs. 10–13) mounted in an upward extension or block 140 on the bar 136. The bar 136 is provided with rack teeth 138 which mesh with the end gear 134 (the left-hand gear in Figs. 11 and 12 and the right-hand gear in Fig. 10). The bar 136 is provided at its lower end with a block 142 which supports a transverse rod 144 carrying a cam follower roller 146 at its outer end. Vertical guide bars 148 are provided on opposite sides of the rod 144 for guiding the rod in vertical reciprocation. A cam 150 (Figs. 6 and 10) is mounted on the carrier 58 for rotation therewith to encounter the cam follower 146 to raise the bar 136 once for each rotation of the carrier as will be described in greater detail hereinafter. A coil spring 152 encircles the bar 136 and is trapped between the block 142 and a fixed frame part 154 for normally urging the bar 136 down. The reciprocation of the bar 136 and hence of the bar 132 is on the order of 1/8 of an inch in a machine constructed in accordance with the principles of this invention.

The receiver 43 is completed by a horizontal plate 156 lying above the receptacles or trays 42 and provided with elongated openings 158 lying above the receptacles. Part of the material removed in forming the openings 158 is bent downwardly at right angles to form tongues 160 lying immediately adjacent the end of each tray 42 which is disposed toward the center of the machine, i. e. the upper end in Fig. 12 and the right-hand end in Fig. 13. Shrimps which are positioned with their tails against these tongues are properly positioned for subsequent operations thereon.

The loading conveyor 52 comprises a plurality of trays 50 as hereinbefore noted. These trays comprise pairs of diverging side walls 162 (Figs. 3 and 11) interconnected by an integral bottom 164. The trays 50 are of shorter extent than the receptacles or trays 42 and have the forward edges thereof positioned directly beneath the forward edges of the receptacles 42. The conveyor trays 50 thus terminate at their rear edges short of the rear edges of the receptacles 42 so that when the tray side walls are moved apart to drop shrimps from the receptacles 42, they land in the conveyor trays 50 with their tails extending beyond the rear edges of the conveyor trays.

The conveyor trays are mounted in any suitable manner on a sprocket chain 166 (Figs. 1, 2, 4, 7, 11, and 19). The sprocket chain 166 is passed over the idler sprockets 54 and the drive sprocket 56 as heretofore noted. The horizontal reach of the sprocket chain 166 is paralleled by cylindrical bars 168 (Figs. 4 and 9) spaced on opposite sides thereof and supporting the trays 50 for movement without tipping or sagging of the top reach of the conveyor 52. Sagging of the top reach further is prevented by a brake 168 (Fig. 1) in the form of a spring having a free end thereof frictionally riding on a disc 170 affixed to the upper idler sprocket 154. To preclude slack anywhere in the conveyor 52, one of the idler sprockets 54 (the lower right-hand sprocket in Fig. 1) is rotatably mounted on the end of a weighted arm 172 pivotally mounted at 174 on the frame of the machine.

The conveyor 52 must be moved one step (i. e. the distance between the centers of adjacent trays) for each 1/6 revolution of the carrier 58 in order to supply shrimps to the carrier at the proper rate. In order to effect such movement there is provided a reciprocable push rod 176 (Figs. 4, 7, 10, 19, and 20) which is mounted for vertical reciprocation in suitable supports such as 178 (Figs. 4 and 10) carried by the machine frame.

The push rod 176 is provided with a weight 180 which normally urges the rod down. The weight carries a rack 182 which meshes with a gear 184 rotatably mounted on a fixed shaft 186 carried by an upstanding support or frame member 188 (Figs. 4 and 10) and a bracket 190 (Fig. 4) carried by one of the vertical frame members 34. The gear 184 is formed integrally with a cylinder 192 which has a substantially radially extending arm 194 which is welded or otherwise suitably secured thereon. The arm 194 carries a stop member 196 extending generally in the direction of the weight 180 and carrying at its outer end a rubber bumper 198. A radially extending stop 200 on the weight 180 is encountered by the rubber bumper to limit rotation of the cylinder 192 and gear 184 and hence to limit downward movement of the rack 182, weight 180, and push rod 176.

Figures 19, 20, 21, 22, 23:
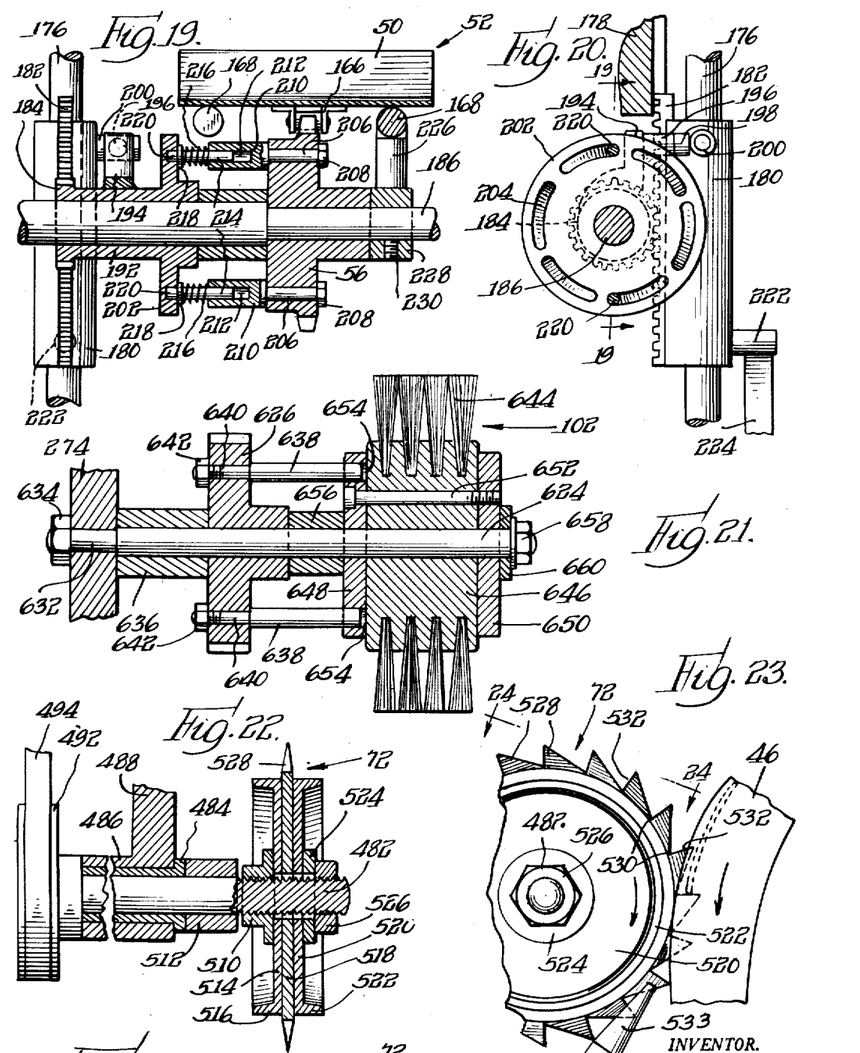
Fig. 19 is a sectional view of the loading conveyor drive mechanism taken substantially along the line 19—19 of Fig. 20.
Fig. 20 is a view partly in section of the loading conveyor drive mechanism taken substantially along the line 20—20 of Fig. 4 on an enlarged scale.
Fig. 21 is a cross-sectional view of the brush for cleaning the clamps taken substantially along the line 21—21 of Fig. 4.
Fig. 22 is a cross-sectional view of the deveining knife.
Fig. 23 is an axial view of the deveining knife engaging a shrimp.
Figure 24:
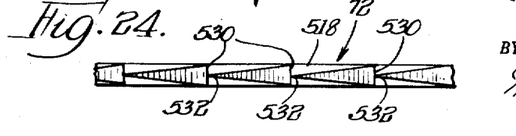
Fig. 24 is a radial view on an enlarged scale of the knife teeth as taken along the line 24—24 of Fig. 23.

The cylinder 192 has formed therewith a radially extending circumferential flange or cam wheel 202. This cam wheel is provided in the face opposite the gear 184 with a plurality of arcuate cams 204, specifically six in number. The cams 204 are formed so that they extend a substantial distance in from the face of the cam wheel 202 at their clockwise ends and are inclined out toward the face of the cam wheel in a counterclockwise direction therefrom. The driving sprocket wheel 56 is provided with a plurality of bolts 206 extending axially therethrough and held in place by nuts 208. The bolts are equal in number to the cams 204 and are provided with enlarged head portions 210 having cylindrical sockets 212. Pins 214 are mounted in these sockets and are urged outwardly by coil springs 216 encircling the pins and trapped between the head portions 210 and stop collars 218 on the pins. The heads 220 of the pins 214 extend into the cams 204. Thus, when the push rod 176 and rack 182 are raised to rotate the gear 184 and cam wheel 202 in a counterclockwise direction as seen in Fig. 20, the recessed ends of the cams 204 engage the pin heads 220 and rotate the sprocket 56 therewith. When the push rod 176 is released, the weight 180 causes it to fall back to its lower position, thus effecting clockwise rotation of the cam wheel 202. The inclined surfaces of the cams 204 force the pins 214 back against the force of the springs 216 until the pin heads snap into the next adjacent cams, the rubber bumper 198 at the same time engaging the stop 200 to preclude further retraction of the push rod 176.

In order to effect the necessary lifting of the push rod 176, a cam follower 222 (Figs. 7, 19, and 20) extends radially from the weight 180 into the path of a series of cams 224 mounted on the carrier 58. The construction and operation of these cams will be more fully brought out hereinafter.

It will be noted that one of the rods 168 supporting the upper reach of the loading conveyor 52 is supported by an upstanding member 226 on a collar 228 which is fixed on the fixed shaft 186 by means such as a set screw 230.

*The carrier*

A fixed shaft 232 (Figs. 4, 5, 7, 9, and 10) extends across the machine and is held in place by means such as set screws 234 engaging in circumferential recesses in the shaft. A flywheel 236 (Figs. 5, 6, 7, and 10) having a sleeve 238 (Fig. 10) is rotatably mounted on the fixed shaft 232. A ring gear 240 having external gear teeth 242 is spaced coaxially from the fly wheel 236 by spacers 244. Bolts 246 pass through the ring gear 240 and the spacers 244 and are threaded into the fly wheel to hold the fly wheel and gear together. The fly wheel 236 and the remainder of the carrier 58 are driven by a gear meshing with the ring gear 240 as will be brought out hereinafter.

A pair of cam plates 248 is fixed to the fixed shaft 232 by means such as pins 250 passing through hubs 252 on the cam plates and also through the shaft 232. The cam plates 248 are spaced from one another by spacer rods 254 which are held to the plates by screws passing through the plates and threaded into the rods 254. These rods act as braces to strengthen and rigidify the cam plates and positively prevent spreading apart of the plates as they effect their camming action. A washer 256 is interposed between the fly wheel 236 and the adjacent cam plate 248 to maintain these two parts spaced apart. The flywheel further is positioned by a sleeve 258 interposed between the fly wheel hub or sleeve 236 and the fixed, upright frame member, wall or support 188.

Figure 9:
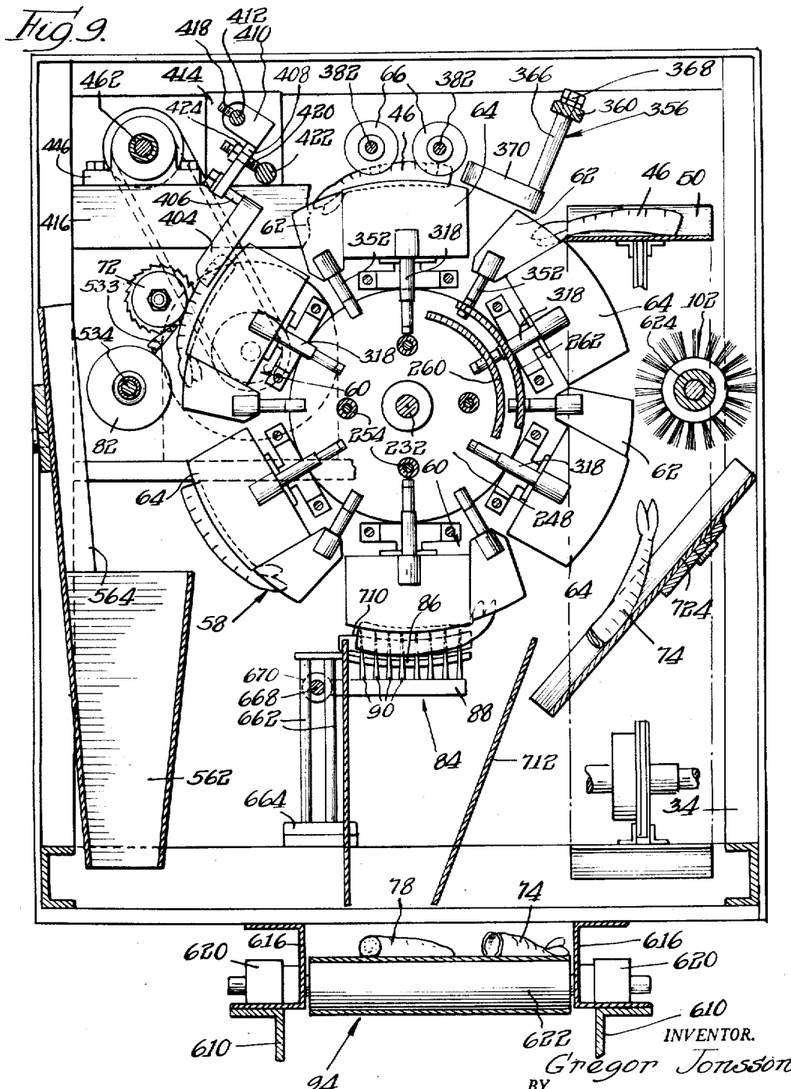
Fig. 9 is a vertical view taken along the line 9—9 of Fig. 6.

The confronting faces of the cam plates 248 may be flat throughout the greater extent, and are provided in the upper right quadrant thereof as viewed in Fig. 9 with a pair of radially spaced apart cam projections 260 and 262 (Figs. 9, 10, and 15–17). The innermost active cam portion 260 is of slightly greater arcuate extent in both directions than is the outer active cam portion 262. The exact position of these active cam portions is adjustable by angularly shifting the fixed shaft 232. Such angular shifting is controlled by an arm 264 (Fig. 4) secured to the shaft 232 by a set screw 266 threaded through a boss 268 on the arm and bearing against the shaft. The arm 264 is provided adjacent its outer end with an arcuate slot 270 receiving a bolt 272 which is threaded into a horizontal frame or support member 274. When the bolt 272 is loosened, the arm can be moved up and down to adjust the angular position of the shaft 232 and 260. The arm 264 is provided with a longitudinal rib 276 for stiffening the arm and providing a ready grip for moving the arm.

The clamp sets 60 hereinbefore mentioned are carried by the fly wheel 236. Each clamp set comprises a central block 278 (Figs. 10, 14, 15, and 16) having a lower T-shaped body portion 280 provided with a stiffening rib 282. At the opposite ends of the T cross member there are raised bosses 284 provided for the receipt of bolts 286 which extend through the fly wheel 236, and through spacer members 288 before passing through the apertures in the bosses. Nuts 290 are threaded on the ends of the bolts to secure the clamp sets on the fly wheel.

The block 278 is provided with an upwardly extending wall 292 having a strengthening rib 294 and provided at its upper end with the right angularly disposed flange 68 or back-up plate previously disclosed. This flange or plate is of arcuate configuration in its long dimension as best may be seen in Fig. 14.

Each body clamp 64 comprises a pair of clamp members having clamping jaws 296 and 298 of arcuate configuration overlying the flange or plate 68 and substantially meeting one another. These clamping jaws are formed integral with side plates 300 and 302. A pair of arms 304 project inwardly from the plate 300 and are mounted on a pivot pin 306 extending through the block 278. One of the arms 304 immediately adjoins the block 238, while the other is spaced therefrom as readily may be seen in Fig. 14. A similar pair of arms 308 offset from the arms 304 extends inwardly from the plate 302 and also is mounted on the pin 306. One of these arms 308 is positioned immediately adjacent the block 278 on the opposite side thereof from the similar arm 304, while the other arm 308 is at the opposite end of the pin 306.

Sleeves 310 encircle the pin 306 to space adjacent arms 304 and 308 from one another. Coil springs 312 encircle these sleeves and have their outer ends 314 engaging lower flanges 316 on the plates 300 and 302 so as normally to urge the jaws toward one another.

Each body clamp 64 is completed by a pair of cam followers in the form of cylindrical pins 318 extending downwardly from enlargements 320 on the walls 300 and 302. The cam follower pins are held in place in these enlargements by means such as set screws 322. The cam follower pins are sufficiently long to reach down as far as the inner cams 260.

In addition to the pin 306, a pin 324 extends through the block 278 of each clamp set 60. The pin 324 is spaced below the pin 306 and is held in place in the block by means such as a set screw 326. A reduced portion 328 of the pin 324 extends forwardly of the body clamp 64 and carries the corresponding tail clamp 62.

Figure 18:
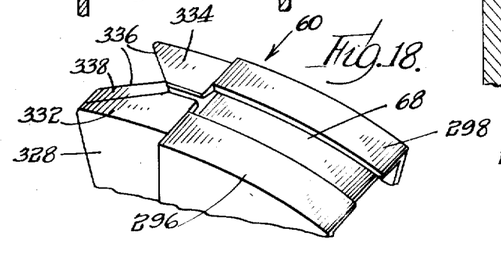
Fig. 18 is a perspective view of a pair of clamps with the tail clamp closed in clamping position and the body clamp in open, body-receiving position.

Each tail clamp comprises a pair of side walls 328 and 330 having right angularly disposed flanges or jaws 332 and 334 at their upper edges. These flanges are provided with parallel confronting edges throughout a portion of their lengths, and then diverge as at 336 as may be seen in Figs. 14 and 18 to facilitate entrance of a shrimp tail between the jaws. The jaw 332 is provided with an extension 338 projecting beyond the parallel edge of the opposite jaw 334 with the jaws in closed position as shown in Fig. 18. This extension or projection facilitates the grasping of tails in the proper position. The wall 328 is provided with a pair of extending arms 340, while the wall 330 is provided with a pair of arms 342. These arms are alternately arranged and are apertured to fit over the reduced pin section 328. A sleeve 344 is arranged centrally of the arms properly to space them apart and is surrounded by a coil spring 346. The ends 348 of the spring engage confronting flanges 350 on the lower portions of the side walls 328 and 330 so as normally to urge the jaws 332 and 334 toward one another. The jaws are held on the reduced end portion 328 of the pin 324 by a collar 351 fixed to the end of the reduced section by a set screw 353.

The tail clamps 62 are completed by cam follower pins 352 extending downwardly from enlargements 354 on the side walls 328 and 330. These cam followers are long enough to engage the outer cams 362, but are sufficiently short to avoid engagement with the inner cams 260.

*The shrimp centering means*

Figure 7:
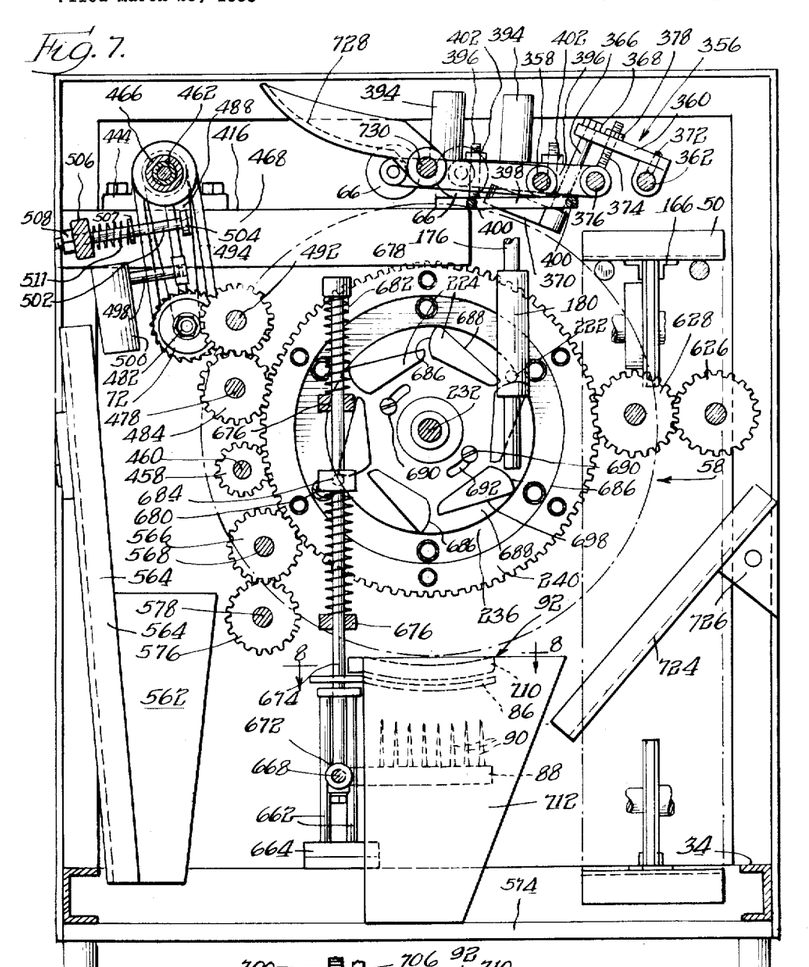
Fig. 7 is a vertical sectional view taken along the line 7—7 of Fig. 6.
Figure 8:
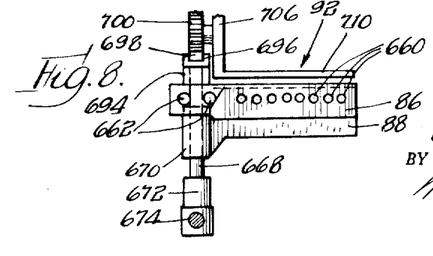
Fig. 8 is a detail horizontal view along the line 8—8 of Fig. 7.

The tails of the shrimps 46 are grasped by the tail clamps 62 to pull the shrimps from the trays 50 of the loading conveyor as can be seen in Fig. 9. The bodies of the shrimps must be aligned with the space between the open jaws 296 and 298 of the body clamps in order properly to lie on the back-up plates 68 so that they may be grasped by the jaws. In order first to centralize the shrimp bodies, I have provided a straightener 356 (Figs. 5, 7, and 9). The straightener is supported from a horizontal support member 358 (Figs. 4 and 5) projecting from the side of the vertical support member 188 to which it is welded or otherwise suitably secured.

The straightener comprises a substantially L-shaped arm 360 (Figs. 4, 5, 7, and 9) which is pivotally mounted on a pin 362 having a reduced threaded portion extending through the support 358 and held in place thereon by a nut 364. A pair of studs 366 extends downwardly from the arm 360 and is held in place on the arm by reduced end portions extending through the arm and threadedly receiving nuts 368. A pair of leaf spring members 370 (Figs. 5, 7, 9, and 11) is carried at the bottom of the studs 366 and converge with one another. The spring members 370 are positioned immediately adjacent the periphery of the clamp sets 60 and shrimps pulled by the tail from the loading conveyor trays 50 must pass between these spring members which act by their convergence to centralize the shrimp bodies with the space between the open body clamps.

Means is provided for adjusting the position of the spring members 370 relative to the clamp sets and includes a set screw 372 threaded through the arm 360 and abutting the pin 362. This pin normally locks the arm, and hence the spring members in adjusted position, but may be loosened for adjustment. Fine control over adjustment is obtained by a screw 374 threaded through the arm and bearing against a hub 376 shortly to be described in greater detail. A jam nut 378 for locking the screw 374 in adjusted position is provided.

The shrimp bodies are further centralized and are pressed down against the back-up plates 68 of the body clamps by the presser rollers 66 (Figs. 5, 7, and 9) as previously noted. These rollers as best may be seen in Fig. 5 are provided with peripheral grooves 380 with diverging edges similar to pulley wheels. The presser wheels are mounted for rotation on axles 382 projecting from the ends of angular arms 384 and 386. The arm 386 is fixed to the aforementioned hub 376 which is pivotally mounted on a stud 388 carried by the horizontal support member 358. The arm 384 is similarly fixed to a collar 390 pivotally mounted on a stud 392 carried by the support member 358. The presser wheels 66 are urged toward the clamp sets by weights 394 carried by the arms 384 and 386. Set screws 396 are threaded through these arms and abut a platform 398 (Fig. 5) carried from the support 358 by a pair of studs 400. Jam nuts 402 are threaded on the screws 396 for locking the same in adjusted position.

It will be apparent that the substantially V shape of the grooves 380 of the presser wheels 66 further serves to centralize the shrimp bodies, while the weights 394 cause the presser wheels to press the shrimp bodies firmly down against the back-up plates 68 so that the bellies may be gripped by the body clamps as heretofore discussed with regard to Figs. 3a–3f.

Further straightening and aligning is provided to insure central slitting of the shrimp backs by the knife 72. Such further centralization is effected by a second pair of leaf spring members 404 (Figs. 5 and 6) carried at the ends of studs or projections 406 on an L-shaped arm 408. These spring members are converging similar to the previously described spring members. The L-shaped arm 408 is provided with an upstanding flange 410 which is pivotally mounted on a pin 412. The pin 412 is fixedly mounted on a plate 414 mounted on a horizontal support 416 carried by the machine frame 34.

A set screw 418 is threaded through the flange 410 and abuts the pin or stud 412 for locking the leaf spring members 404 in adjusted position. Fine adjustment is effected by a screw 420 threaded through the arm 408 and bearing against a stud 422 projecting from the side of the plate 414. A jam nut 424 is provided for locking the screw 420 in adjusted position.

The drive mechanism

Driving power for the entire machine is provided by an electric motor 426 (Figs. 5 and 6) mounted on a suitable platform 428 carried by the machine frame in any desired manner. The motor is provided with a pulley 430 which acts through a belt 432 to drive a pulley 434 which is fixed to a cross shaft 436 by any suitable means such as a pin 438 (Fig. 6) passing through the hub of the pulley and through the cross shaft.

The cross shaft is journaled in bearings 440 and 442 carried by suitable bearing mounts 444 and 446 mounted on the transverse frame member 416 and a parallel transverse frame member 447 respectively.

A pulley 448 (Figs. 4–7 and 9) is fixed on the end of the shaft opposite the pulley 434 and a belt 450 is passed over this pulley to drive a pulley 452 on the input shaft 454 of a speed reducing gear box 456. A gear 458 (Figs. 4, 6, 7, and 9) on the output shaft 460 meshes with the ring gear 240 for driving the carrier 58.

A sleeve 462 (Figs. 4, 6, 7, and 9) encircles the cross shaft 436 and is mounted on a bracket 464 carried by the horizontal support 416. A pulley 466 (Figs. 4–7 and 9) is rotatably mounted on this sleeve relatively toward the end of the shaft carrying the pulley 448. A belt 468 passes over the pulley 466 and a pulley 470 mounted on a shaft 472 supported by a depending member 474 on the horizontal supporting angle member 447. A gear 476 also is mounted on the shaft 472 and is fixed to the pulley 470 for rotation therewith. Another shaft 478 is carried by the depending support 474 and rotatably mounts a gear 480 which meshes with the ring gear 240 and with the gear 476 for driving the latter, thereby to rotate the sleeve 462.

Various other drive mechanisms are connected with those just described to be driven thereby, but are more conveniently discussed hereinafter with the respective mechanisms operated thereby.

The deveining knife

The knife 72 heretofore mentioned and shown in Figs. 3, 4, 6, 7, 9, and 22–24 is mounted on a shaft 482 journaled in a bushing 484 (Fig. 22) carried by a hub 486 of a supporting arm 488. This arm is provided with a cylindrical bearing portion 490 (Fig. 6) pivotally mounting the knife supporting arm 488 on the sleeve 462.

A pulley 492 is mounted on the opposite end of the knife shaft 482 and is driven by a belt 494 from a pulley 496 fixed on the cross shaft 436.

A rod 498 (Figs. 5–7) extends from the knife supporting arm 488 rearwardly of the machine and adjustably carries a weight 500. The dimensions of the parts are so arranged that the weight pivots the knife supporting arm 488 to hold the knife in engagement with the backs of shrimps as they are carried past the knife by the carrier 58.

A limit stop is provided for preventing the knife from moving too close to the carrier 58 and thereby cutting the shrimp too deeply. This limit stop comprises a rod 502 (Figs. 5 and 6) having a flange 504 overlapping the knife supporting arm 488 to limit its position toward the carrier. The rod 502 passes through a support 506 (Figs. 4 and 7) and has a nut 508 (Fig. 5) threaded on the end thereof. A coil spring 511 compressed between the support 506 and a washer 507 normally urges the rod toward the knife supporting arm 488 so that no pushing on the rod 502 is necessary when the nut 508 is backed off to allow the knife to move closer to the carrier 58.

The structure of the knife 72 is such as simultaneously to slit the back of the shrimp and to remove the sand vein from the shrimp. The structure is shown in detail in Figs. 22–24 wherein it may be seen that the outer end of the knife carrying shaft 482 is threaded. A flanged collar 510 is threaded on this shaft adjacent a spacer 512 abutting the bearing bushing 484. The collar 510 impinges against a plate 514 having an axially extending circumferential flange 516 which bears against the knife blade 518. A plate 520 having an axially extending circumferential flange 522 is held against the opposite side of the knife blade by a washer 524 and a nut 526 threaded on the end of the shaft 482. The flanges 416 and 422 limit the depth to which the blade 518 can penetrate a shrimp as may be seen in Fig. 23, thereby preventing the knife from digging too deeply into a large shrimp when the knife is properly adjusted for deveining small shrimps.

In order that the knife may devein the shrimp in addition to cutting through the shell thereof, I have provided teeth 528 of unique configuration. These teeth increase uniformly from a minimum height at their leading edges 530 to a maximum height at their trailing edges 532. The teeth further are of the full width of the knife blade 518 at their leading edges and taper uniformly to a sharp point at their trailing edges. This configuration of the teeth allows them readily to slit the shell of the shrimp and the meat immediately under the shell, while at the same time effecting ejection of the sand vein from each shrimp.

A spray nozzle 533 (Figs. 9 and 23) is supported adjacent the knife by any suitable means (not shown). The nozzle is supplied with water from any convenient source (not shown) and keeps the knife clean and cleans the meat adjacent the sand vein.

The remaining parts operated by the drive mechanism

The roller 82 previously referred to and shown in Figs. 3, 4, 6 and 9 is fixed on a shaft 534 rotatably journaled in a hub 536 (Fig. 6) on the end of an arm 538 which is provided with a hub 540 pivotally mounting the arm on the sleeve 462. A pulley 542 (Figs. 4 and 6) is mounted on the opposite end of the shaft 534 and is driven by a belt 544 (Figs. 4–6) passed over a pulley 546 on the sleeve 562 for driving the roller 82. A rod 548 projects laterally from the roller carrying arm 538 and adjustably carries a weight 550. In the same manner as with the deveining knife, the parts are so dimensioned that the weight 550 holds the roller against the meat of shrimps 46 carried past the roller by the carrier 58.

Means for limiting the position of roller 82 is provided and comprises a rod 552 (Figs. 5 and 6) having a flange 554 (Fig. 6) thereon overlying the roller supporting arm 438. The rod 552 passes through the support 506 (Figs. 4 and 7) previously mentioned and has a nut 556 (Fig. 5) threaded on the end thereof. A coil spring 558 encircles the rod 552 and is compressed between the support 506 and a washer 560 on the rod so that the rod need not be pushed toward the carrier when the nut 556 is backed off.

Figures 10, 10A:
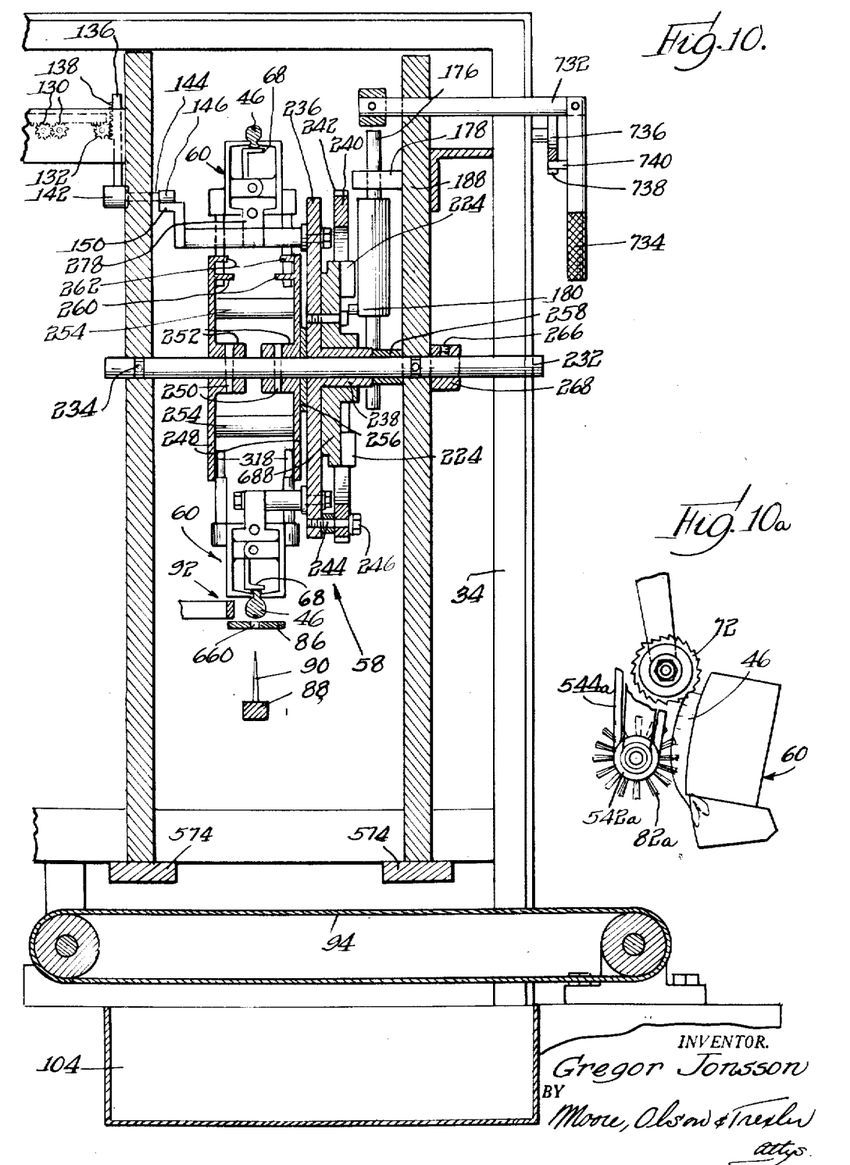
Fig. 10 is a vertical sectional view taken along the line 10—10 of Fig. 4.
Fig. 10a is a view similar to a portion of Fig. 4 with a brush substituted for the roller.

I have found that in certain instances the sand vein may be more efficaciously removed from the shrimps and the meat may be more thoroughly cleaned of the parts surrounding the sand vein if a brush is used in addition to the deveining knife. Such an arrangement is shown in Fig. 10a wherein a brush 82a is shown substituted for the roller 82. Except for the substitution of the brush for the roller, the structure remains identical and further description is believed unnecessary beyond the brief mention that the brush is driven by a belt 544a acting on a pulley 542a on the brush shaft.

Figure 4:
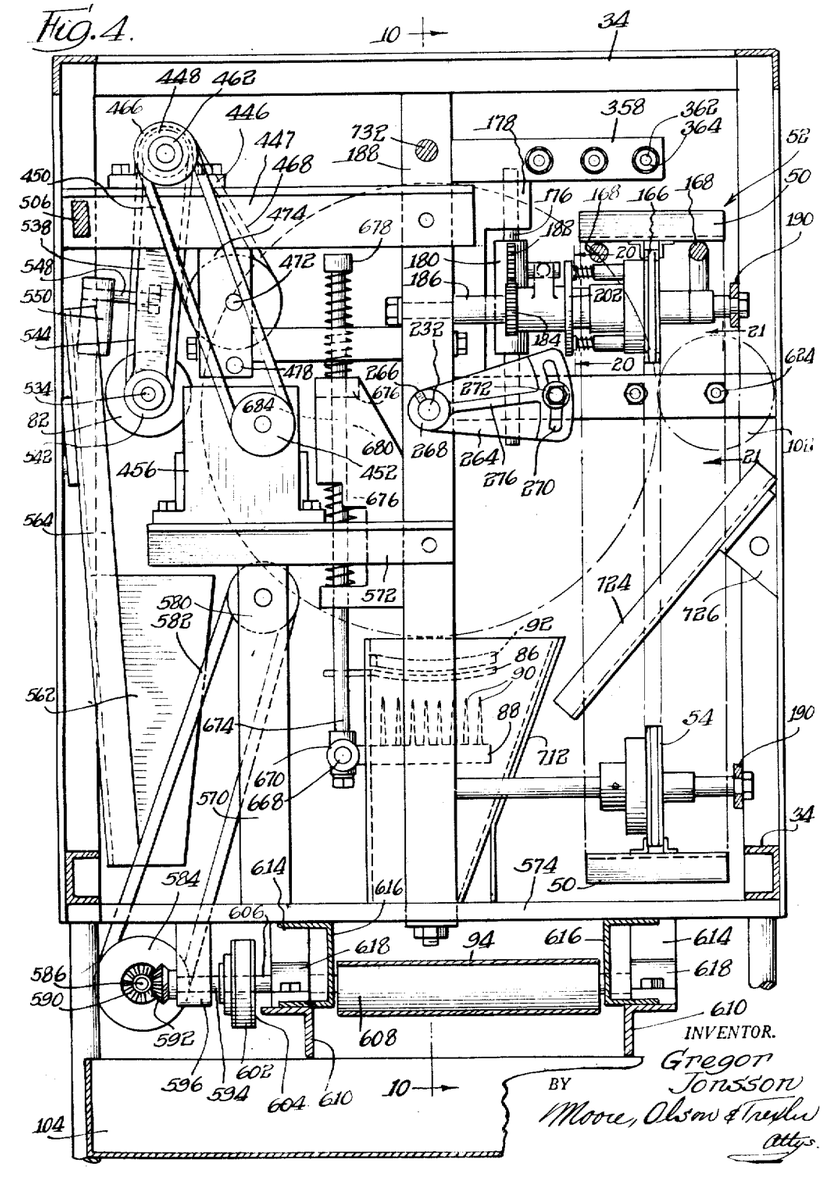
Fig. 4 is a side sectional view on an enlarged scale taken along the line 4—4 of Fig. 1.
Figure 5:
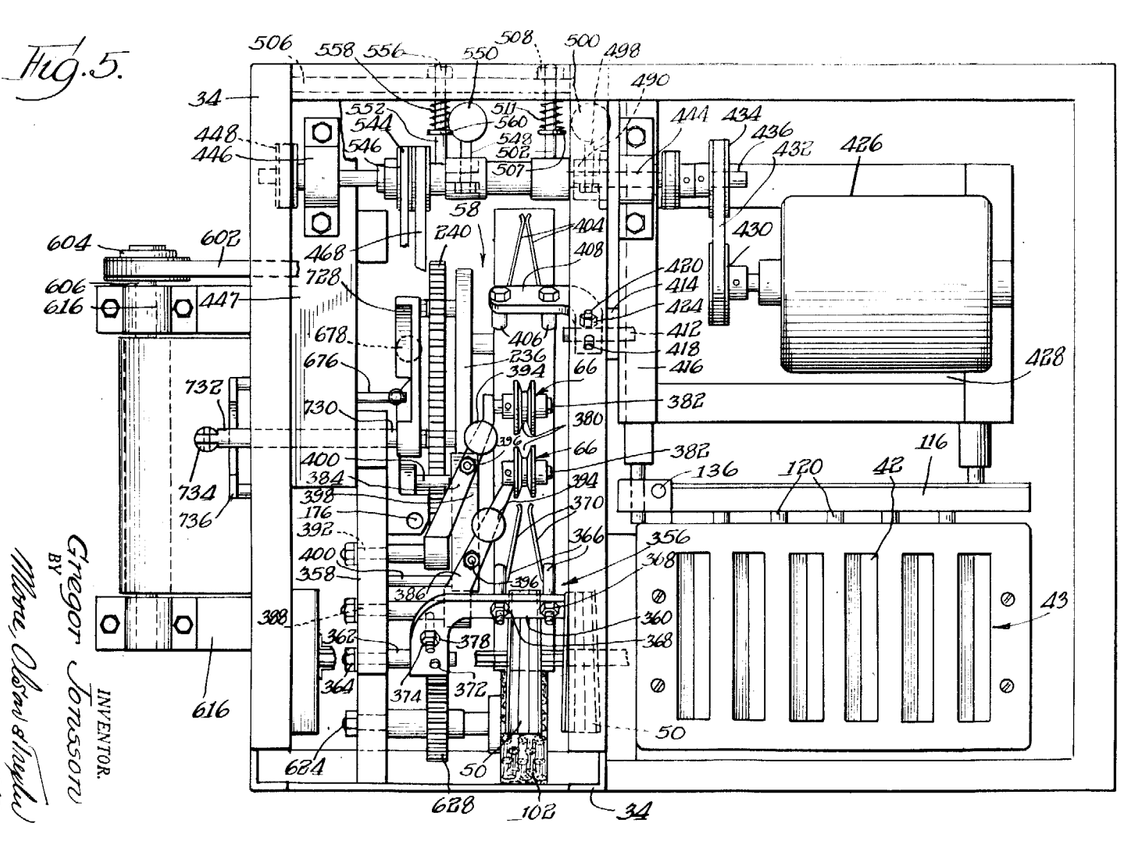
Fig. 5 is a top view on an enlarged scale with certain parts removed taken along the line 5—5 of Fig. 1.

Beneath the periphery of the carrier 54 and on the left side thereof as viewed in Figs. 4, 7, and 9, there is provided a tapered chute or funnel 562 which is suitably supported from the frame of the machine by means such as an angle member 564 for catching the sand vein and other debris displaced from the shrimp by the deveining knife or the brush. The chute or funnel 562 is open at the bottom so that the sand veins and debris will pass through the chute or funnel into the receptacle 104 (Figs. 1, 2, and 4). It will be understood that suitable conveyor means could be provided for receiving the material from the funnel or chute 562.

A gear 566 meshes with the ring gear 240 substantially directly beneath the ring driving gear 458. This gear is mounted on a shaft 568 (Fig. 6) fixed in an upstanding support 570 which carries the horizontal angle member 572 serving to support the gear box 456. The upstanding member 570 is carried by an intermediate horizontal support 574 on the frame 34 and also serves to support the intermediate vertical support 188. The gear 566 meshes with a gear 576 (Figs. 6 and 7) rotatably mounted on a shaft 578 carried by the upstanding support 570. A pulley 580 (Figs. 4 and 6) is rotatably mounted on the shaft 578 and is fixed to the gear 576 for rotation therewith. A belt 582 passed over the pulley 580 drives a pulley 584 which is mounted on a stub shaft 586 journaled in a suitable bearing bracket 588 carried by the frame of the machine. A bevel gear 590 is fixed on the end of the shaft 586 and meshes with a bevel gear 592 fixed on the end of a cross shaft 594 journaled in a support 596 (Fig. 4) depending from a cross member 574 carried by the machine frame. The cross shaft is provided with a pulley 600 (Fig. 6) which acts through a belt 602 (Figs. 4 and 5) to drive a pulley 604 spaced outside of the machine frame and mounted on the axle 606 of one of the rollers 608 of the discharge conveyor 94. The discharge conveyor 94 includes a pair of angle members 610 (Figs. 1, 2, 4, 6, and 9) extending from end to end of the conveyor and of sufficiently heavy gage to be rigid. The angle members are supported by suitable hangers 612 (Figs. 1 and 6) and 614 (Figs. 1 and 4). Relatively light gage channels 616 (Figs. 1, 2, 4, 5, 6, and 9) are suitably secured along the tops of the channels and extend from end to end of the conveyor to prevent processed or cleaned shrimps from falling from the sides of the conveyor.

The axle 606 heretofore noted is journaled in suitable bearings 618 (Figs. 1 and 4) mounted on the outer ends of the angle members 610, while similar bearings 620 (Figs. 1, 6, and 9) at the inner ends of the angle members carry an axle on which is rotatably mounted the other idler roller 622 of the conveyor 94.

The sole remaining part that is driven by the part heretofore referred to as the drive mechanism comprises the brush 102 for cleaning the clamps. The brush is shown in Figs. 3, 4, and 10 and is mounted on a shaft 624 which is carried by the same horizontal member 274 that the bolt 272 of the mechanism for adjusting the timing of the clamp cams is threaded into. A gear 626 (Figs. 4, 5, 7 and 21) is also mounted on this shaft for rotation with the brush. The gear 626 meshes with a gear 628 mounted on a shaft 630. The gear 628 meshes, in turn with the ring gear 240.

The specific construction of the brush 102 and its connection to the gear 626 may be seen with reference to Fig. 21. The shaft 624 is provided with a reduced end portion 632 extending through the support 274 and held in place by a nut 634 threaded on the end of the shaft. A cylindrical sleeve 636 encircles the shaft 624 and spaces the gear 626 from the support 274. A plurality of radially disposed, arcuately spaced spokes 638 has reduced end portions 640 extending through the gear 626. Nuts 642 are threaded on these reduced end portions to hold the spokes on the gear.

The brush 102 includes a plurality of sets of bristles 644 mounted in any suitable or convenient manner in a cylindrical brush holder 646. Plates 648 and 650 are held on opposite sides of the brush holder 646 by screws 652 passing through the brush holder 646 and threaded into the plate 650, the heads of the screws being countersunk in the plate 648. The plate 648 is provided with arcuately spaced radial apertures 654 adapted to receive the ends of the spokes 638. A separator 656 is interposed between the hub of the gear 626 and the plate 648 properly to space the brush from the gear so that the spokes will enter the apertures 654 without imposing any axial stress between the spokes and the brush. A nut 658 clamping against a washer 660 on the end of the shaft 624 holds the brush against the spacer 656.

It is apparent that when the brush is worn, it readily can be replaced without disturbing the gear 626 by merely removing the nut 658 and sliding the brush axially off of the shaft 624.

*The meat separating mechanism*

The meat separating mechanism, as aforenoted, comprises a plate 88 (Figs. 3, 4, 6, 7, 9, and 10) carrying a plurality of spikes. This plate is adapted to reciprocate vertically and in so doing to push the spikes upwardly through apertures 660 (Figs. 3d, 3e, 3f, 8, and 10) of a stripper 86 into the meat 78 of a shrimp 46. The stripper 86 is of generally arcuate configuration complementary to the carrier 58 and is supported at one end by a pair of spaced apart, upstanding posts 662 (Figs. 4 and 7-9) on a fixed member 664 suitable supported on a cross member 666 on the machine frame.

A shaft 668 projects through an enlargement 670 at the end of the spike carrying plate 88 and between the posts 662 to guide the spikes and plate in vertical movement. The enlargement 670 is fixed to the shaft 668 to preclude relative rotation thereof, and another enlargement 672 is fixed to the end of the shaft. This enlargement carries an upright push rod 674 which is mounted for reciprocation in a pair of ears 676 (Figs. 5 and 7) fixedly supported from the machine frame in any desirable manner. The push rod 674 is provided with a stop 678 at its upper end and with a stop 680 intermediate the ears 676. Springs 682 are compressed between each stop and the ear beneath it normally to urge the push rod up. The lowermost stop 680 is provided with a radial stud 684 projecting toward the carrier and into the path of the cams 224 carried thereby.

The cams 224 have arcuate or curved leading edges 686 with relieved, straight edges 688 extending rearwardly therefrom so that as the carrier rotates, the curved leading edges 686 engage the studs 684 to depress the push rods 674 and spike plate 88 relatively slowly to avoid damage to the meat, and the straight, relieved edge 688 allows the plate and push rod to snap upwardly at a rapid rate under the impetus of the springs 682. The cams 224 are mounted on the face of a disc 688 (Figs. 7 and 10) which is adjustably fastened to the fly wheel 236 by bolts 690 passing through arcuate slots 692 in the plate 688 and threaded into the fly wheel 236. The bolt-in-slot attachment provides for angular adjustment of the cams relative to the remainder of the carrier.

These cams 224 also engage the stud 222 projecting from the weight 180 on the push rod 176 to move the loading conveyor step by step in timed relation to the movement of the carrier.

Figure 6:
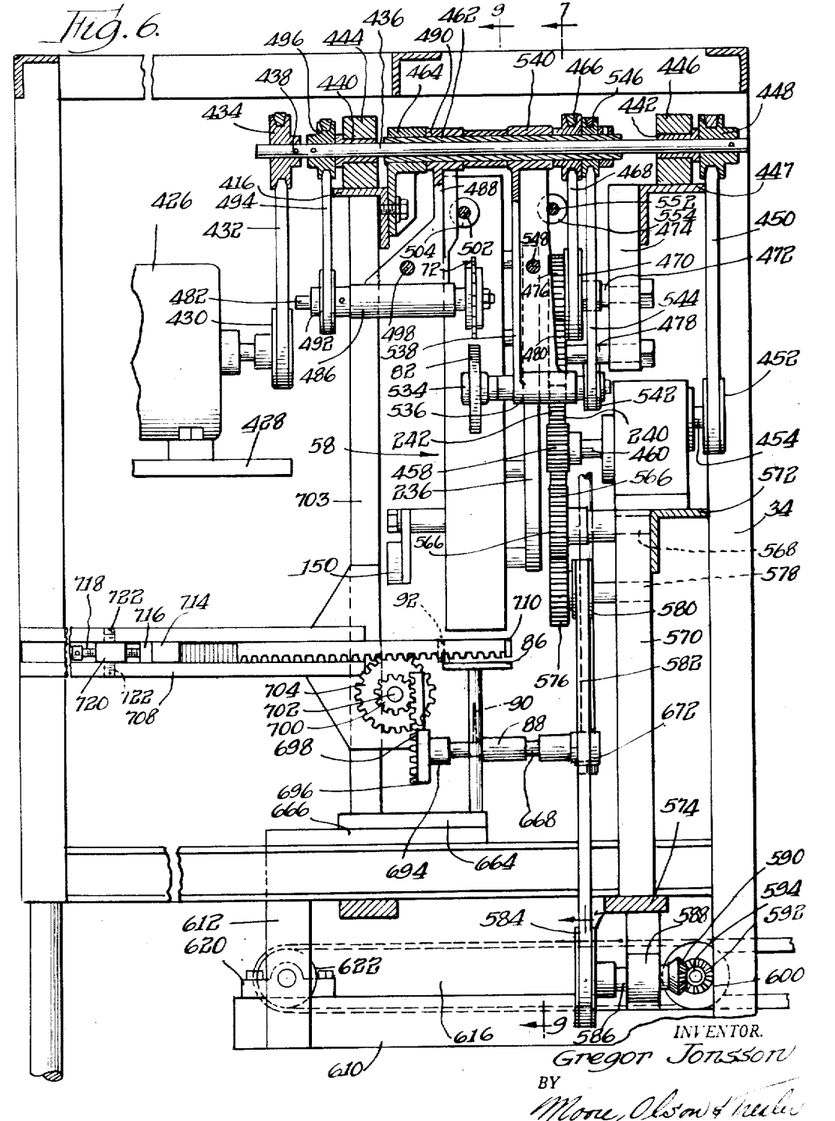
Fig. 6 is a rear sectional view on an enlarged scale taken along the line 6—6 of Fig. 2.

The rod or shaft 668 projects between the posts 662 as previously noted. An enlargement 694 on the projecting end thereof carries a channel 696 (Figs. 6 and 7). A rack 698 is mounted in the channel and may be adjustable therein if so desired.

The rack 698 meshes with a pinion 700 (Figs. 6 and 8) which is mounted on a shaft 702 carried by a suitable brearing bracket (not shown) on one of the machine vertical supports 703. A larger gear 704 also is mounted on this shaft and is fixed for rotation with the pinion 702. The larger gear 704 meshes with a rack 706 slidably mounted in a track 708. A pusher 92 comprises a plate 710 (Figs. 4, 6, 7, and 9) carried at the end of the rack 706 for reciprocation back and forth across the upper surface of the stripper 86. The lower edge of the pusher plate 710 is of arcuate or curved configuration so as to be substantially complementary to the upper curved surface of the stripper 86. As the spike carrying plate 88 is depressed the rack 698 rotates the pinion 700 and gear 704 to move the rack 706 (to the right, as viewed in Fig. 6) to move the pusher across the surface of the stripper and thereby to push the shrimp meat from the stripper from whence it falls into a funnel or chute 712 supported by the cross member 574. This funnel or chute is open at the bottom so as to channel the shrimp meat on to one side of the conveyor 94.

The extent of movement of the rack 706 and hence of the pusher 710 and of the spikes 90 is controlled by a bumper 714 carried by a stop member 716 in the track 708. The stop member and bumper are adjustable by means of a screw 718 threaded through a sliding block 720 and having its end received in the stop 716 for rotation therein without axial movement therein. The track 708 is channel-shaped and a pair of set screws 722 threaded through the side flanges of the channel abut the block 720 which is longitudinally adjustable by loosening these set screws and then tightening them after the shifting of the block. Such movement of the block 720 provides a wider range of adjustment than is possible with the screw 718 alone.

The carrier 58 is moving at the time spikes 90 penetrate the meat, but the spikes rise so rapidly under the impetus of the springs 682 that they spike into the meat without tearing the meat. While the spikes are in raised position, the carrier moves to pull the shell away from the meat. Each shell is carried by the carrier beyond the funnel or chute 712 until the clamps 62 and 64 are opened by their respective cams 262 and 260 just below the clamp cleaning brush 102. The shells 74 then fall from the carrier as shown in Fig. 9 on to an inclined plate or deflector 724 (Figs. 4, 7, and 9) supported by a bracket 726 on the machine frame 34. The deflector directs the shells 74 on to the conveyor 94 and on the opposite side thereof so that the shells may fall into the receptacle 98 (Fig. 2) while the meat 78 falls into the adjacent receptacle 96.

As noted earlier, it often is desirable to separate the meat from the shell as just described, while on other occasions it is desirable to leave the meat in the shell. Provision is made for rendering the meat separating mechanism 84 inoperable when it is desired to leave the meat in the shell. This provision comprises a cam 728 (Figs. 5 and 7) positioned generally above the stop 678 on the push rod 674 and fixed on the end of a shaft 730 rotatably mounted in the cross support 447 and extending outside of the machine casing as at 732 (Figs. 1, 2, and 5). A handle 734 is pivoted on the outer end 732 of shaft 730 for pivoting movement about a diameter of the shaft. An arcuate plate or sector 736 is mounted on the casing and projects outwardly a short distance therefrom substantially into contact with the handle 734 when this handle is arranged at right angles to the shaft 730. The sector 736 is provided with a plurality of spaced apertures 738 (Fig. 2) for receiving a pin 740 on the handle 734 to lock the shaft 730 in any angular position of adjustment. It will be understood that when the handle 734 is pivoted about its mount to remove the pin 740 from one of the sector apertures 738 the shaft 730 can be rocked by the handle to position the cam 728 a substantial distance above the stop 678 as seen in Fig. 7, or to lower the cam so that it will contact the stop 678 with the stop in the position shown in Fig. 7. With the cam in lowered position, the push rod 674 is held down against the action of the springs 682 independently of the cams 224 so that the spikes 90 cannot rise to penetrate the meat. The meat and shell therefore are dropped as a unit on to the deflector 724 for gravitational passage down on to conveyor 94.

*Operation of the machine*

Shrimps 46 are dropped into the hopper 48 without any necessity for grading the shrimps as to size or for arranging them in any particular manner. The slight inherent vibration of the machine causes the shrimps to slide down the inclined plate 44 where they are grasped by the operator and positioned in the receiver receptacles or trays 42 with the shrimp tails against the tongues 160.

Once in each revolution of the carrier 58 the cam 150 engages the roller 146 to raise the rod 136 and thereby to open the receptacles or trays 42 so that the shrimps will drop into the conveyor trays 50 with their tails extending from the ends thereof.

The conveyor 52 moves stepwise in response to engagement of the cams 224 against the pin 222 and stops with each tray in succession aligned with the space between the clamp sets 60 of the carrier 58. The tails of the shrimps are clamped between tail clamps 62 which pull the shrimps from the trays through the straightener 356 and under the rollers 66 where the shrimps' bodies are clamped by the body clamps 64.

The carrier continues to rotate at a uniform rate, as it does at all times, and the shrimps are further centralized by the spring members 404 so that the shells may be slit by the knife 72. The knife at the same time as it slits the shell cuts the meat a predetermined depth and ejects the sand vein therefrom, while the water jet associated with the knife cleans out the meat and cleans the knife. The pressure of the body clamp on the belly or underside of each shrimp causes the shell to spread apart along the back where it is slit. This allows the roller 82 to enter for pressing the meat down slightly to pull it from the shell; and each shrimp is carried to the meat removing station 84 where the spikes 90 snap up into the meat.

Continued rotation of the carrier with the spikes in raised position pulls each shell from its associated meat, and the meat then is pushed from the stripper 86 by the pusher 710 after the spikes have been lowered. The shells are dropped from the carrier upon opening of the clamps by the respective cams, and the meat and shells 78 and 74 respectively fall on to their respective sides of the conveyor 94 which operates continuously to move them from the machine into the receptacles provided.

The brush 102 then cleans the clamps as the carrier moves them past the brush.

The feeding of the shrimps tail first with the method and machine herein disclosed, and the arresting of the meat, provides for relative longitudinal movement of the shell and meat to effect separation thereof. As a result of the tail first feeding this movement is such that the meat moves relative to the shell from the narrow to the large end of the shell, thereby pulling cleanly away from the shell without leaving any substantial portions clinging thereto.

The gripping of the underside of the shrimp bodies effects spreading apart at the slits cut in the shells without requiring any complicated mechanism for such spreading, and partially pulls the shells from the meat.

The novel knife blade herein disclosed for simultaneously slitting the shrimp shells and removing the sand veins effects efficient vein removal without tearing the meat or removing too much of the meat along with the vein.

The gripping of the shrimps first by the tail facilitates automatic loading of the carrier, and the gripping of the shrimps by the tail and by the undersides of the shells prevents crushing or otherwise damaging any edible portions of the shrimp meat, and effects efficient separation of the meat and shells as heretofore noted.

The method herein disclosed is inexpensive and is very efficient. The method and machine herein disclosed remove the veins from shrimps and remove the shells from the meat in a simple and positive way heretofore unknown in the art.

It should be understood that the specific method and structure herein shown and described are illustrative of the invention, and are not limitative. Various changes may be made and form a part of my invention insofar as they fall within the spirit and scope of the appended claims.

I claim:

1. The method of processing shrimps which comprises slitting the shell of a shrimp longitudinally, gripping the shell substantially opposite to the slit to effect spreading of said slit, and relatively moving the shrimp meat and shell in different directions to effect separation thereof.

2. The method of processing shrimps which comprises feeding a shrimp tail first past a slitting station, slitting the shell of the shrimp as it moves past said station, spreading the shell along the slit so formed, and thereafter relatively moving the shrimp shell longitudinally toward the tail of the shrimp and the shrimp meat toward the head of the shrimp to effect separation of the meat and the shell.

3. The method of processing shrimps which comprises feeding a shrimp tail first past a slitting station, slitting the back of the shell as the shrimp is fed past said station, gripping the under side of the shell to effect spreading of the slit so formed, and thereafter relatively moving the shrimp shell longitudinally toward the tail of the shrimp and the shrimp meat longitudinally toward the head of the shrimp to effect separation of the meat and the shell.

4. The method of processing shrimps which comprises gripping shrimps by the under side of the shells, slitting the backs thereof, continuing the gripping of the under sides to effect spreading of the slits, and longitudinally separating the shells and meat while continuing the gripping of the under sides of the shells.

5. The method of processing shrimps which comprises gripping the under sides of shrimp shells, feeding the shrimps tail first while so gripped past a slitting station, slitting the backs of the shells as they are fed past said station and simultaneously effecting spreading of the slits by gripping the under sides thereof, and thereafter relatively feeding the shrimp shells tail first and the shrimp meat head first away from one another to effect separation thereof.

6. The method of processing shrimps which comprises clamping the under sides of shrimps, feeding the shrimps tail first while so clamped past a slitting station, slitting the backs of the shells as they are fed past said station and simultaneously removing the veins, the continued clamping of the under sides of the shells effecting spreading of the slits, and arresting the shrimp meat while continuing to feed the clamped shells tail first to effect separation of the shells and the meat.

7. The method of processing shrimps which comprises slitting the shell of a shrimp longitudinally, holding the shell without compressing the meat therein, and relatively moving the shell toward the tail of the shrimp and the meat toward the head of the shrimp to effect longitudinal separation of the shell and the meat.

References Cited in the file of this patent

UNITED STATES PATENTS

| | | |
|---|---|---|
| 604,603 | Caruthers | May 24, 1898 |
| 1,988,898 | Hafner | Jan. 22, 1935 |
| 2,034,691 | Bottker et al. | Mar. 24, 1936 |
| 2,263,694 | Grayson | Nov. 25, 1941 |
| 2,299,774 | Weems | Oct. 27, 1942 |
| 2,301,729 | Krull | Nov. 10, 1942 |
| 2,515,101 | Swinden | July 11, 1950 |
| 2,594,205 | Paoli | Apr. 22, 1952 |
| 2,625,705 | Avetta et al. | Jan. 20, 1953 |
| 2,644,980 | McKinstry | July 14, 1953 |

FOREIGN PATENTS

| | | |
|---|---|---|
| 185,210 | Switzerland | Oct. 1, 1936 |